(12) United States Patent
Scuderi et al.

(10) Patent No.: US 11,455,424 B2
(45) Date of Patent: *Sep. 27, 2022

(54) TAGGING AND AUDITING SENSITIVE INFORMATION IN A DATABASE ENVIRONMENT

(71) Applicant: ZenPayroll, Inc., San Francisco, CA (US)

(72) Inventors: Christopher Joseph Scuderi, Daly City, CA (US); Edward Kim, San Francisco, CA (US)

(73) Assignee: ZENPAYROLL, INC., San Francisco, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/159,161

(22) Filed: Jan. 27, 2021

(65) Prior Publication Data
US 2021/0150057 A1    May 20, 2021

Related U.S. Application Data

(63) Continuation of application No. 16/676,438, filed on Nov. 7, 2019, now Pat. No. 10,943,026, which is a (Continued)

(51) Int. Cl.
*G06F 21/00* (2013.01)
*G06F 21/62* (2013.01)
(Continued)

(52) U.S. Cl.
CPC ........ *G06F 21/6245* (2013.01); *G06F 3/0482* (2013.01); *G06F 3/04817* (2013.01);
(Continued)

(58) Field of Classification Search
None
See application file for complete search history.

(56) References Cited

U.S. PATENT DOCUMENTS 7,069,451 B1 * 6/2006 Ginter ................... H04N 7/162
                                                       713/168
9,965,648 B1 * 5/2018 Cheng ................. H04L 9/0643
(Continued)

FOREIGN PATENT DOCUMENTS

JP          2013152497 A       8/2013

OTHER PUBLICATIONS

United States Office Action, U.S. Appl. No. 16/355,491, filed Jun. 30, 2021, 46 pages.

*Primary Examiner* — Maung T Lwin
(74) *Attorney, Agent, or Firm* — Fenwick & West LLP

(57) ABSTRACT

Access to sensitive information in a database can be restricted to improve security and enable efficient auditing. A security engine receives a request from a requesting entity to access data in the database and determines that the requested data includes sensitive information. In response to the requesting entity being authorized to access the data, the security engine retrieves the requested data from the database and modifies the retrieved data by modifying metadata of the retrieved data to include a tag indicating that the retrieved data includes sensitive information. The security engine provides the modified data to the requesting entity and modifies a data access log to identify each attempted access to the modified data. When sensitive data is requested, an interface can include an obscuring element, requiring a user to manually select the element to view the data, enabling the logging of the explicit access request by the user.

20 Claims, 11 Drawing Sheets

Related U.S. Application Data continuation of application No. 16/355,502, filed on Mar. 15, 2019, now Pat. No. 10,521,605.

(51) Int. Cl.
*G06F 21/84* (2013.01)
*G06F 3/04817* (2022.01)
*G06F 16/2457* (2019.01)
*G06F 16/248* (2019.01)
*G06F 3/0482* (2013.01)

(52) U.S. Cl.
CPC ...... *G06F 16/248* (2019.01); *G06F 16/24573* (2019.01); *G06F 21/84* (2013.01); *G06F 2221/2101* (2013.01)

(56) References Cited

U.S. PATENT DOCUMENTS

| | | | | |
|---|---|---|---|---|
| 2002/0069363 A1* | 6/2002 | Winburn | ............ | G06F 21/64 726/4 |
| 2005/0140572 A1* | 6/2005 | Kahan | ............ | G09C 5/00 345/7 |
| 2008/0300952 A1* | 12/2008 | Couper | ............ | G06Q 10/06311 705/7.13 |
| 2009/0287837 A1* | 11/2009 | Felsher | ............ | G06F 21/6245 709/229 |
| 2011/0055922 A1* | 3/2011 | Cohen | ............ | H04L 63/1475 726/22 |
| 2013/0042008 A1* | 2/2013 | Das | ............ | G06F 16/986 709/226 |
| 2014/0040154 A1* | 2/2014 | Webb | ............ | G06Q 90/00 705/325 |
| 2014/0344900 A1* | 11/2014 | Das | ............ | G06F 16/955 726/4 |
| 2015/0067886 A1* | 3/2015 | Maman | ............ | G06F 16/2443 726/27 |
| 2015/0161397 A1* | 6/2015 | Cook | ............ | G06F 21/60 726/26 |
| 2015/0200922 A1* | 7/2015 | Eschbach | ............ | H04L 63/08 358/1.14 |
| 2016/0320943 A1* | 11/2016 | Kim | ............ | G06F 3/0486 |
| 2018/0020001 A1 | 1/2018 | White et al. | | |
| 2018/0293403 A1* | 10/2018 | Cheng | ............ | H04L 9/0643 |
| 2018/0359282 A1 | 12/2018 | Roth et al. | | |
| 2019/0073483 A1 | 3/2019 | McClintock et al. | | |
| 2019/0138625 A1 | 5/2019 | Umansky et al. | | |
| 2019/0182038 A1 | 6/2019 | Shanks et al. | | |
| 2019/0342088 A1 | 11/2019 | Eidson et al. | | |
| 2020/0175209 A1 | 6/2020 | Yost | | |
| 2020/0327252 A1* | 10/2020 | McFall | ............ | G06F 21/78 |

* cited by examiner

Personnel ID: 1

Company: Lorem Co.  Title: ▨▨▨
Name: ▨▨▨
Address: ▨▨▨▨▨▨
Phone: ▨▨▨
Email address: ▨▨▨▨  Social Security: ▨▨▨

Residence: ▨▨▨
Annual Salary: ▨▨▨ — 450
Birthday: ▨▨▨

Work Info

Health Insurance:

Employer Coverage (Bi-Weekly):

Employee Cost (Bi-Weekly): $53.00

Authenticate to View:
ID  50
Password  *******
Submit

— 460

Life Insurance: LF 2 Insurance

Employer Coverage (Bi-Weekly): $5.00

Employee Cost (Bi-Weekly): $1.75

Vision Insurance: None/Opted Out

Employer Coverage (Bi-Weekly): N/A

Employee Cost

FIG. 4B

Logged in as Client ID: 50

Personnel ID: 1

Company: Lorem Co.  Title:
Name:
Address:
Phone:
Email address:  Social Security:

Residence:
Birthday:  Annual Salary:  52,000

Work Info

| | | |
|---|---|---|
| Health Insurance: | Insurance PPO | |
| Employer Coverage (Bi-Weekly): | $424.49 | |
| Employee Cost (Bi-Weekly): | $53.00 | |
| | | |
| Life Insurance: | LF 2 Insurance | |
| Employer Coverage (Bi-Weekly): | $5.00 | |
| Employee Cost (Bi-Weekly): | $1.75 | |
| | | |
| Vision Insurance: | None/Opted Out | |
| Employer Coverage (Bi-Weekly): | N/A | |
| Employee Cost | N/A | |

```
┌─────────────────────────────────────────────────────────────┐
│ Display an interface on a client device for displaying one  │
│ or more sets of data from the personnel database in         │
│ corresponding data fields                                   │
│                          710                                │
└─────────────────────────────────────────────────────────────┘
                              ↓
┌─────────────────────────────────────────────────────────────┐
│ For each set of data corresponding to non-sensitive         │
│ information, access the set of data from the personnel      │
│ database and display the set of data in the corresponding   │
│ data field                                                  │
│                          720                                │
└─────────────────────────────────────────────────────────────┘
```

For each set of data corresponding to sensitive information

- Display a selectable graphical interface element within the interface to obscure the corresponding data field
  730

- Receive a request to view the set of data from a receiving entity, the request including a selection of the graphical interface element
  740

- Authenticate to determine whether the requesting entity authorized to view the set of data
  750

User Authorized → Access the set of data from the personnel database and display the set of data within the corresponding data field
760B

User Unauthorized → Display a message in the interface indicating that the requesting entity is not authorized to view the set of data
760A

- Remove the displayed graphical interface element from the interface such that the set of data is visible within the corresponding data field
  770

- Modify the access log to identify the request to view the set of data
  780

FIG. 7

TAGGING AND AUDITING SENSITIVE INFORMATION IN A DATABASE ENVIRONMENT

CROSS-REFERENCE TO RELATED APPLICATIONS

This application is a continuation of U.S. patent application Ser. No. 16/676,438, filed on Nov. 7, 2019, now U.S. Pat. No. 10,943,026, which application is a continuation of U.S. patent application Ser. No. 16/355,502, filed on Mar. 15, 2019, now U.S. Pat. No. 10,521,605, all of which is hereby incorporated in its entirety.

This disclosure relates generally to tracking sensitive information, and more specifically to tagging and auditing accessed sensitive information in a database environment.

BACKGROUND

Database structures are used to store data tables accessed and used by one or more applications on one or more client devices. A database may include sensitive information that a user of the database may access. Particularly in cases of multiple users of the database having varying degrees of authority, tracking the access of sensitive information in the database is difficult. There is a need for an efficient method of restricting and tracking the access of sensitive data in the database without detrimentally impacting the database or the security of the stored data. Likewise, there is a need to improve the auditing of access to such sensitive information.

SUMMARY

Access to sensitive information in a database system can be restricted using a security engine, to improve security and enable efficient auditing. By using the security engine to restrict access to sensitive information and tagging information as sensitive, the security and accountability of sensitive information in the database is efficiently improved, without detrimentally impacting the operation of the database system. Additionally, the database system may incorporate a legacy database to be used together with the security engine, without substantially altering the legacy database.

The security engine receives a request from a requesting entity to access data in a database and determines that the requested data includes sensitive information. In response to the requesting entity being authorized to access the data, the security engine retrieves the requested data from the database and modifies the retrieved data by modifying metadata of the retrieved data to include a tag indicating that the retrieved data includes sensitive information. The security engine provides the modified data to the requesting entity and modifies a data access log to identify each attempted access to the modified data. When sensitive data is requested, an interface can include an obscuring element, requiring a user to manually select the element to view the data, enabling the logging of the explicit access request by the user. Since access to the sensitive information is logged in the data access log, access to the sensitive information can be tracked by auditing the data access log.

Restriction of a display of data from a database, including sensitive information is achieved using an interface provided by an interface engine. The interface is displayed on a client device, with one or more sets of data from a database displayed in corresponding data fields. For each set of data corresponding to non-sensitive information, the security engine accesses the set of data from the database, and the interface engine displays the set of data within the corresponding data field. For each set of data corresponding to sensitive information, the interface engine displays a selectable graphical interface element within the interface to at least partially obscure the corresponding data fields. A user of the interface may request to view a set of data by selecting the corresponding selectable graphical interface element. In response to receiving a request to view the set of data corresponding to sensitive information and in response to determining that a requesting entity is authorized to view the set of data, the security engine accesses the set of data from the database. The interface engine then displays the set of data within the corresponding data field and removes the displayed graphical interface element from the interface such that the set of data is visible within the corresponding data field. The security engine modifies the data access log to identify the request to view the set of data, the modified data access log identifying the requesting entity, the set of data, and a time associated with the request to view the set of data.

BRIEF DESCRIPTION OF THE DRAWINGS

FIGS. 4A-4E are example graphical user interfaces (GUIs) for accessing data in a database system with a client device, in accordance with an embodiment.

FIG. 7 is a flowchart illustrating a process for restricting a display of data in an interface, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
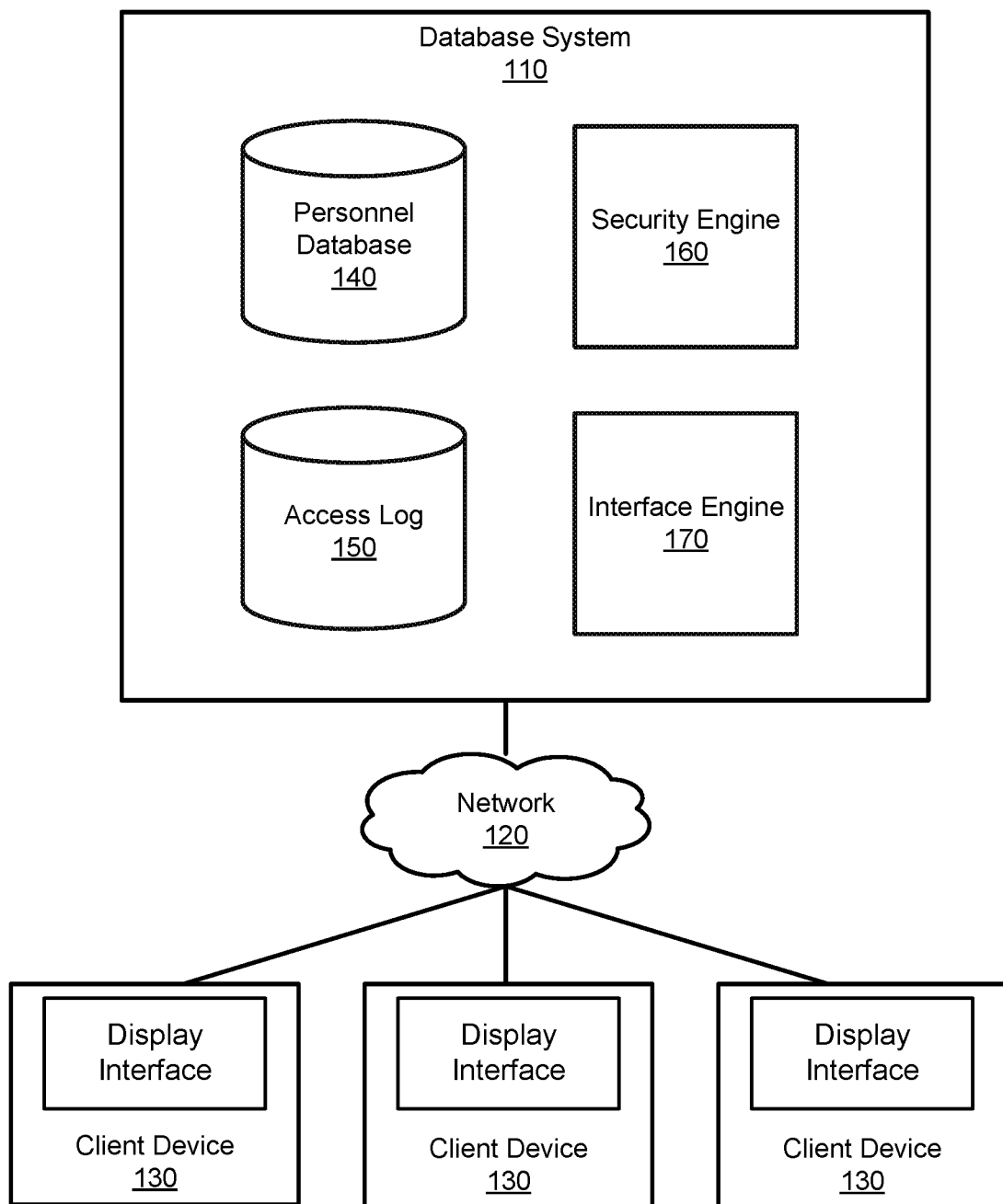
FIG. 1 is a block diagram of a system environment in which a database system operates, in accordance with an embodiment.

FIG. 1 is a block diagram of a system environment in which a database system operates, in accordance with an embodiment. The system environment 100 shown by FIG. 1 includes a database system 110, a network 120, and one or more client devices 130. In alternative configurations, different and/or additional components may be included in the system environment 100.

The database system 110 stores and maintains a personnel database 140 and related modules to organize and store data within the personnel database 140, and to manage access to the stored data. In one embodiment, the database system 110 operates on a central computer or database system, such as a server or set of servers operating within a datacenter. The database system 110 is configured to communicate with a network 120 and may be accessed by client devices 130 via the network 120. Each of the client devices 130 may include a computer system that may include a display and input controls that enable a user of the database system 110 to interact with a user interface for accessing, viewing, and/or manipulating data. The database system 110 shown in FIG. 1 includes the personnel database 140, an access log 150 (or "data access log"), a security engine 160, and an interface engine 170. In other embodiments, the database system 110 may contain additional, fewer, or different components for various applications. Conventional components such as network interfaces, security functions, load balancers, failover servers, management and network operations consoles, and the like are not shown so as to not obscure the details of the system architecture.

The personnel database 140 stores and maintains data for the database system 110. The stored data in the personnel database 140 includes sensitive information that is restricted, such that only authorized users of the database system or users with particular access permissions may access and/or modify the sensitive information, also referred to herein as "sensitive data", in the database system 110. Various types of data may be stored in the personnel database 140. For example, data may include financial transaction data, personally identifiable information ("PII"), healthcare records, user data (for instance, describing a user's actions or communications within a network), social media data, sensor data, and the like. Some or all of the data stored in the personnel database 140 may be sensitive data, such as social security numbers, phone numbers, full names of individuals, and/or addresses of individuals. The sensitive data may be restricted, such that only a set of users with an authority level above a threshold level of authority may access and/or modify the sensitive data, according to some embodiments.

Data stored in the personnel database 140 may be organized into one or more data tables including uniquely identified rows and columns. In some embodiments, at least one of the columns of the personnel database 140 corresponds to sensitive information. In some embodiments, the personnel database 140 is associated with a schema identifying the structure of the database. The schema may identify the data tables, rows, and columns included in the personnel database 140. In some embodiments, the schema further identifies types of data, categories of data, or data sensitivity levels in columns of the personnel database 110. In some embodiments the schema identifies one or more database columns corresponding to sensitive information as defined by a data security policy. For example, the data security policy may comply with the Health Insurance Portability and Accountability Act (HIPAA).

The access log 150 stores and maintains data associated with users and/or accessing entities accessing data in the personnel database 140. The stored data in the access log 150 includes access data representative of attempts to access data in the personnel database and whether or not the attempts were successful. The access data can further identify whether the requested data is sensitive, can include an identifier for the accessing entity, an identifier for the requested or accessed data, a date and time associated with the attempted access, or some combination thereof. In some embodiments, the access data additionally or alternatively includes at least one of: a user account associated with a requesting entity attempting to access the sensitive data, a hardware identifier for a device used by the requesting entity, a software identifier for a software used by the requesting entity to access the sensitive data, a web page used to access the sensitive data, a document form associated with the sensitive data, and one or more fields displayed by a device of a requesting entity associated with the sensitive data.

According to some embodiments, the security engine 160 may perform an audit of the access log 150 to retrieve data from the access log 150 for a user of the database system 110. For example, the security engine 160 may perform an audit of the access log 150 in order to identify a date and time of an attempt to access the sensitive data in the personnel database 140 by an unauthorized requesting entity. In further embodiments, the retrieval of data from the access log 150 may only be performed for authorized users of the database system 110. For example, an authorized user may be an administrator of the database system 110.

The security engine 160 manages access to data in the personnel database 140, including modifying sensitive data retrieved from the personnel database 140, according to some embodiments. In response to a requesting entity, e.g. one of the client devices 130, requesting a set of data from the personnel database, the security engine 160 determines if any of the requested data is sensitive data, e.g. PII. Data that is determined to be non-sensitive is retrieved from the personnel database 140 and provided to the requesting entity. If any of the requested data is sensitive data, the security engine 160 authenticates the requesting entity to determine whether the requesting entity is authorized to access the sensitive data in the personnel database 140, according to some embodiments. In further embodiments, the requesting entity is authenticated using a password, security token, or other credential provided by the requesting entity via a graphical user interface (GUI) provided by the interface engine 170. If the security engine determines that the requesting entity is authorized to access the sensitive data, the security engine 160 retrieves the sensitive data and modifies the retrieved sensitive data from the personnel database 140 by modifying metadata of the retrieved sensitive data to include a tag indicating that the retrieved data is sensitive data. The security engine 160 then provides the modified sensitive data, including the associated metadata, to the requesting entity. For each attempt to access the modified sensitive data by the requesting entity, a different entity, and/or a client device 130, the security engine 160 modifies the access log 150 to identify the attempted access (and characteristics of the attempted access, such as the identity of the entity associated with the access, the time and date of the access, etc. . . . ). In some embodiments, the security engine is also configured to perform audits of the access log 150 to retrieve data from the access log 150.

If the security engine 160 determines that the requesting entity is not authorized to access the sensitive data, the security engine 160 denies the request for the sensitive data and does not access the sensitive data in the personnel database 140. The security engine 160 then modifies the access log 150 to identify the denied request (and characteristics of the denied request, such as the identity of the requesting entity, the time and date of the requested access, and the like). In some embodiments, the security engine 160 also notifies the requesting entity that the request for sensitive data has been denied. In some embodiments, a user of the database system 110, e.g. an administrator, is notified of the denied request.

The interface engine 170 provides an interface for a requesting entity to request and access data, including sensitive data, from the personnel database 140. In some embodiments, the interface provided by the interface engine 170 is a GUI provided to a client device 130. A user may interact with the graphical interface using the client device 130. Examples of a GUI are illustrated in FIGS. 4A-4D. The user may provide inputs within the interface that initiate a request to access a set of data in the personnel database 140. For each attempt to access sensitive data in the personnel database 140, the user is prompted to complete an authentication process by the interface so that the security engine 160 can determine if the user is authorized to access the sensitive data, according to some embodiments. In further embodiments, the authentication process may require the user to provide credentials, two-factor authentication, or other authentication information.

The client devices 130 are one or more computing devices capable of receiving user input as well as transmitting and/or receiving data via the network 120. In one embodiment, a client device 130 is a conventional computer system, such as a desktop or a laptop computer. Alternatively, a client device 120 may be a device having computer functionality, such as a personal digital assistant (PDA), a mobile telephone, a smartphone, or another suitable device. A client device 120 is configured to communicate with the database system 110 via the network 120, for example using a native application executed by the client device 130 or through an application programming interface (API) running on a native operating system of the client device 130, such as IOS® or ANDROID™. In another example, the client device 130 is configured to communicate with the database system 110 via an API running on the database system 110.

The database system 110 and the client devices 130 are configured to communicate via the network 120, which may comprise any combination of local area and/or wide area networks, using wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Each client device 130 is configured to request and access data in the personnel database 140 via the network 120, according to some embodiments. Requested data that is determined by the security engine 160 to be non-sensitive may be accessed by a client device 130. Requested data that is determined by the security engine 160 to be sensitive data is not provided to the client device 130, until the client device 130 and/or a user of the client device 130 is authenticated and (in some embodiments) the metadata of the requested sensitive data has been modified by the security engine 160.

The client device 130 receives sensitive data with metadata that has been modified by the security engine 160 to include a tag indicating the data is sensitive, and stores the modified sensitive data on the client device 130, according to some embodiments. Each time an accessing entity attempts to access the modified sensitive data stored on the client device 130, the client device 130 can report the attempt to access the modified sensitive data to the security engine 160. The security engine 160 subsequently modifies the access log 150 to identify the attempt to access the modified sensitive data.

By modifying the metadata of the sensitive data to include the tag and identifying each attempt to access the modified data in the access log 150, the database system 110 is able to track attempts to access sensitive data originating from the personnel database 140. This includes tracking attempts to access locally stored copies of sensitive data on client devices 130.

Security Engine

Figure 2:
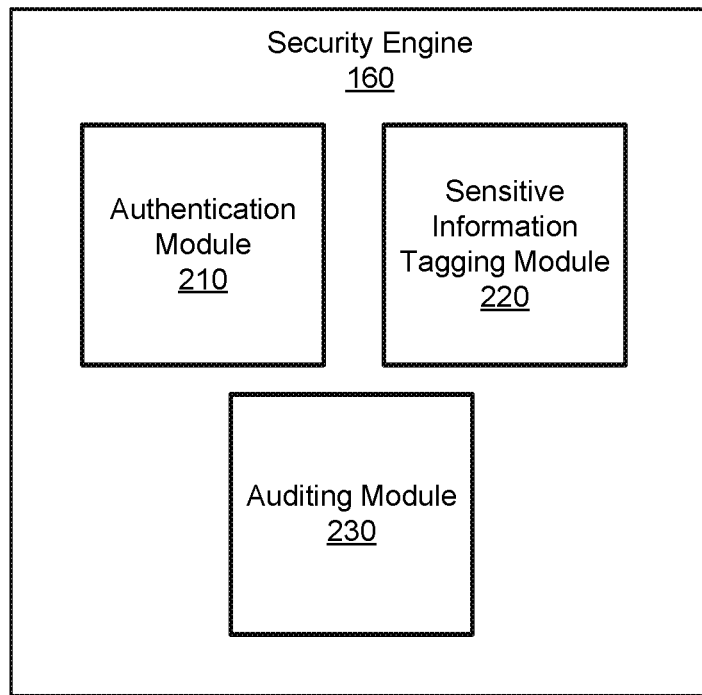
FIG. 2 is a block diagram of a security engine, in accordance with an embodiment.

FIG. 2 is a block diagram of a security engine, in accordance with an embodiment. The security engine 160 includes an authentication module 210, a sensitive information tagging module 220, and an auditing module 230. In other embodiments, the security engine 160 may include additional, fewer, or different components for various functions.

The authentication module 210 authenticates a requesting entity and/or an auditing entity to determine whether the requesting entity and/or auditing entity are authorized to access data in the personnel database 140. The authentication module 210 may determine whether the requesting entity is authorized to access data in the personnel database 140 based on user credentials, a hardware identifier associated with the client devices 130, a software identifier associated with a software used to access the data, an IP address, two-factor authentication, or any other suitable form of authentication. In some embodiments, the type of authentication performed or the authentication credentials required are based on a security level, a data type, or a category of the requested information. For instance, social security numbers may only be accessed by database managers, while less sensitive demographic information may be accessed by any requesting entity within an organization.

The sensitive information tagging module 220 determines whether data requested by a requesting entity is sensitive data. In some embodiments, the sensitive information tagging module 220 determines that the requested data is sensitive data based on an associated column and/or an associated row of a data table of the personnel database 140. For example, the requested data may reside in a column associated with PII. In this case, the sensitive information tagging module 220 may determine that any data residing in a column associated with PII is sensitive data, and thus the requested data is determined to be sensitive. In other embodiments, a requested set of data is determined to be sensitive data based on metadata associated with the requested set of data. In some embodiments, the metadata includes at least one of: a category of data, a type of data, a format of data, a sensitivity of data, and a required authorization level. The metadata, for example, may include an identifier indicating that the requested data is sensitive data. In some embodiments, a requested set of data is determined to be sensitive data based on a format of the requested set of data (e.g., data in the social security number format, XXX-XX-XXXX, is determined to be sensitive). If the requested data is determined to be sensitive, the sensitive information tagging module 220 may instruct the authentication module 210 to authenticate the requesting entity prior to providing access to the requested data, as described above.

If the requesting entity is determined by the authentication module 210 to be authorized to access the requested sensitive data, the sensitive information tagging module 220 retrieves the requested sensitive data from the personnel database 140. The sensitive information tagging module 220 modifies the retrieved data by modifying the metadata of the retrieved data to include the tag indicating the retrieved data includes sensitive information. In some embodiments the metadata of the retrieved data also comprises at least one of: a category of information, a type of data, a format of data, a sensitivity of data, and a required authorization level.

The sensitive information tagging module 220 then provides the modified sensitive data, including the associated metadata, to the requesting entity. The requesting entity may then store the modified sensitive data locally on a client device 130. In some embodiments, the requesting entity can display the modified sensitive data to a user on the client device 130. The modified sensitive data may be displayed on the client device 130 in a GUI provided by the interface engine 170, according to some embodiments. The sensitive information tagging module 220 modifies the access log 150 to identify the request to access the sensitive data in the personnel database 140.

In some embodiments, the sensitive information tagging module 220 also modifies the access log 150 each time an accessing entity subsequently attempts to access the modified sensitive data, including the tag, that is stored locally on the client device 130. In some embodiments, the client device 130 communicates with the sensitive information tagging module 220 each time an accessing entity attempts to access the modified sensitive data stored locally on the local device 130, triggering the sensitive information tagging module 220 to modify the access log 150. In order to identify subsequent attempts to access locally stored sensitive data, the client device 130 can detect the tag within the metadata of the sensitive data identifying the sensitive data as sensitive at the time of the attempt to the access the sensitive data.

In some embodiments, the security engine 160 determines that the modified sensitive data has been accessed by an unauthorized entity. In response, the security engine 160 may send a notification identifying the unauthorized access to a user of the database system 110. In other embodiments, the security engine 160 prevents the unauthorized entity from subsequently accessing the modified data.

The auditing module 230 performs an audit of the access log 150 responsive to receiving a request from an auditing entity. The auditing entity, for example, may be an administrator of the database system 110. In some embodiments, the auditing entity initiates the request in response to suspicious activity related to the personnel database 140. The suspicious activity, for example, may be a data breach and/or leak of sensitive information stored in the personnel database 140. In some embodiments, the auditing module 230 performs an audit of the access log 150 automatically in response to a data breach.

The audit of the access log 150 involves retrieving data corresponding to past attempts to access sensitive data within or provided by the personnel database 140. The auditing module 230 retrieves data from the access log 150 and provides it to the auditing entity. The auditing module 230 may search the data in the access log 150 and pull data relevant to an attempt to access sensitive data matching search criteria. For example, the search criteria may include an identifier for a person associated with sensitive data in the personnel database 140, according to some embodiments. In this case, the auditing module 230 may pull all data relevant to each attempt to access sensitive data associated with the person.

Tagging of Sensitive Information

To tag sensitive data, a requesting entity requests a set of data, including the sensitive data, from the personnel database 140. For each datum of the requested set of data, the security engine 160 determines whether the datum is sensitive. In some embodiments, each datum is determined to be sensitive or non-sensitive based on a sensitivity classification of the column of a data table where the datum is located. The security engine 160 retrieves the non-sensitive data of the requested set of data and provides the non-sensitive data to the requesting entity.

The security engine 160 then authenticates the requesting entity via the authentication module 210, determining whether the requesting entity is authorized to access each of the sensitive datum of the requested set of data. For sensitive data of the requested set of data that the requesting entity is authorized to access, the security engine 160 retrieves the sensitive data from the personnel database 140, approving the request to access that sensitive data. For sensitive data of the requested data that the requesting entity is not authorized to access, the security engine 160 does not retrieve the sensitive data, denying the request to access that sensitive data. The security engine 160 modifies the retrieved sensitive data via the sensitive information tagging module 220 by modifying its metadata to include a tag indicating that the data is sensitive.

The security engine 160 then provides the retrieved data, including the non-sensitive data and the modified sensitive data, to the requesting entity. The data provided to the requesting entity may be stored locally on a client device 130, according to some embodiments. In a further embodiment, the requesting entity displays the data provided from the security engine 160 on the client device 130 within a GUI provided by the interface engine 170.

The security engine 160 also modifies the access log 150 to identify the request to access sensitive data, including requests to access sensitive data that are denied. According to some embodiments, the security engine 160 modifies the access log 150 at substantially the same time that the security engine 160 provides the retrieved data to the requesting entity. In some embodiments, the access log 150 is modified to further identify a user account associated with the requesting entity, a hardware identifier for a device used by the requesting entity to access the modified data, a software identifier for software used by the requesting entity to access the modified data, and information indicating whether the attempt to access the modified data was successful.

Figure 3:
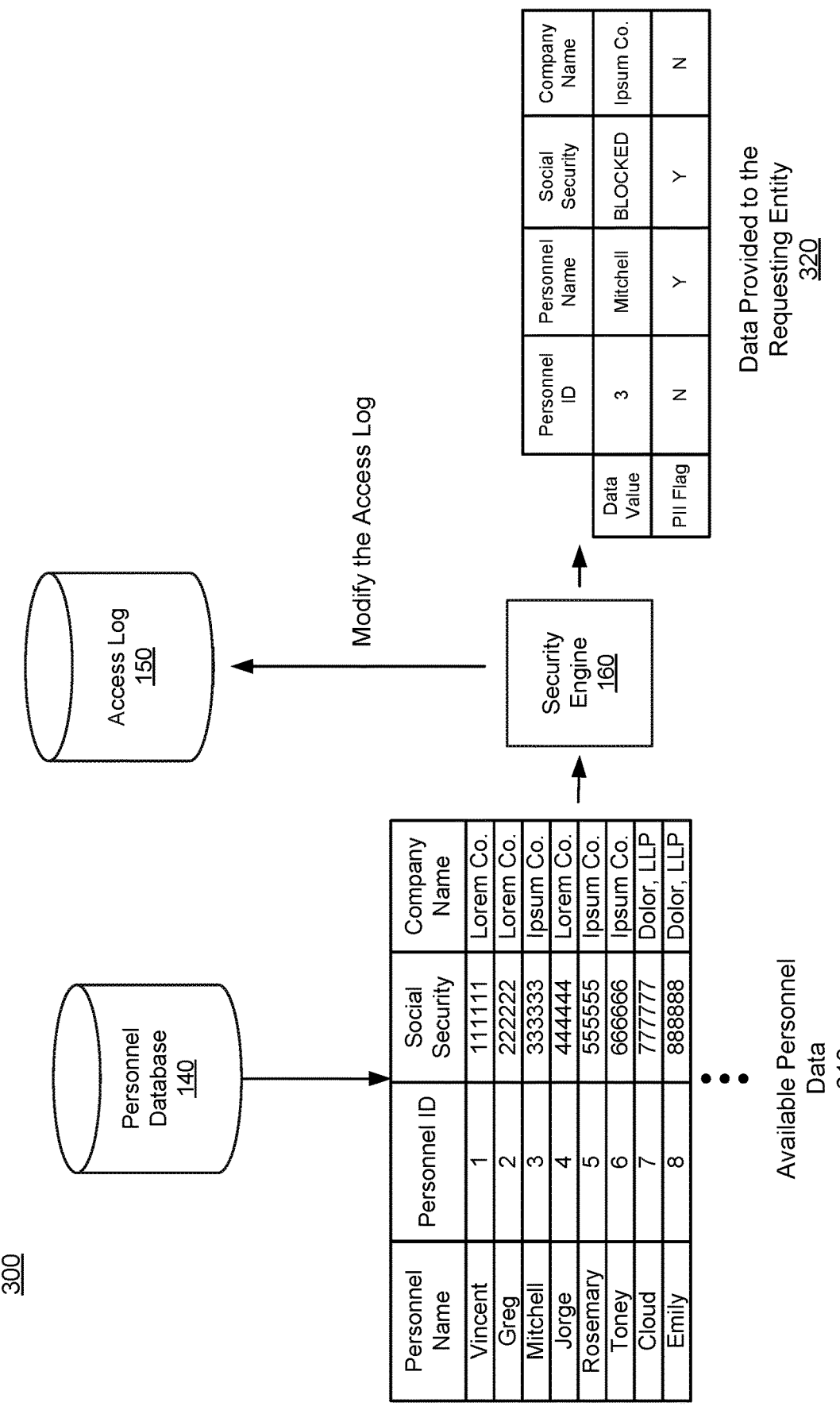
FIG. 3 illustrates an example of accessing and tagging sensitive information in a database with a security engine, in accordance with an embodiment.

FIG. 3 illustrates an example of accessing and tagging sensitive information in a database with a security engine, in accordance with an embodiment. A tagging process 300 of FIG. 3 occurs after a requesting entity requests to access a set of data, including sensitive data, in a personnel database 140. The requested set of data includes a name, a social security number, and a company name associated with an individual whose associated personnel ID equals 3.

A set of available data 310 from the personnel database 140 is shown in FIG. 3. The data in the personnel database 140 is not limited to the data shown in the set of available data 310. In this embodiment, data in the personnel database 140 is organized into a data table. Columns of the data table each uniquely identify a type of data. For example, each column of the personnel database 140 corresponds to a type of data such as personnel name, personnel ID, social security, and company name. Additionally, each row of the data table uniquely identifies an individual whose associated data, including sensitive data, is stored in the data table. For example, a row of the data table may correspond to all the stored data for an individual named "Vincent" and having a personnel ID of "1", as shown in FIG. 3.

A security engine 160 searches the personnel database 140 for the requested set of data, locating the requested set of data in the personnel database 140. Of the requested set of data, the security engine 140 determines that the name and the social security number requested are sensitive (for instance, in response to detecting a "sensitive" flag associated with the "name" and "social security" columns), and that the company name requested is non-sensitive. The security engine 160 retrieves the data value for the company name of the individual with personnel ID "3", "Ipsum Co." In some embodiments, the security engine 160 provides the data value for the company name to the requesting entity before proceeding with authentication.

The security engine 160 then authenticates the requesting entity to determine whether the requesting entity is authorized to access personnel name and social security in the personnel database 140. In the example shown in FIG. 3, the security engine 160 determines that the requesting entity is authorized to access the requested personnel name of the individual, but is not authorized to access the requested social security number of the individual.

The security engine 160 retrieves the data value for the personnel name of the individual ("Mitchell"). The security engine 160 modifies the data corresponding to the name "Mitchell", modifying the metadata to include a tag indicating the data is sensitive. The retrieved non-sensitive data and the modified sensitive data are provided to the requesting entity by the security engine 160. The security engine 160 also provides to the requesting entity a data value indicating that the request to access the social security number of the individual with personnel ID "3" has been denied, in this embodiment. The data provided to the requesting entity 320 by the security engine, in this example, is shown in FIG. 3. The data provided to the requesting entity 320 includes the personnel ID ("3") of the individual, the personnel name ("Mitchell") of the individual, the value indicating that the request to access the social security number for the individual has been denied ("BLOCKED"), and the company name ("Ipsum Co.") of the individual. The requesting entity stores the provided data 320 locally on a client device 130, for instance in volatile memory (such as RAM) or in non-volatile memory (such as a hard drive or SD card. Additionally, the requesting entity may display the provided data 320 on the client device 130 within a GUI provided by the interface engine 170, according to some embodiments.

The security engine 160 modifies an access log 150 to identify the request to access the sensitive data in the personnel database 140, including the personnel name and the social security number of the individual associated with the personnel ID "3". In this case, the security engine 160 modifies the access log 150 to further identify a user ID associated with the requesting entity, information on which data types were requested by the requesting entity, information on the data types of the data provided to the requesting entity 320, and a personnel ID associated with the data provided to the requesting entity 320. In alternative embodiments, the security engine 160 modifies the access log 150 to identify other information relevant to the request to access sensitive data in the personnel database 140. Additionally, each time an accessing entity attempts to access the modified sensitive data stored locally on the client device, the security engine 160 detects the attempt by detecting the flag included within the metadata of the modified sensitive data, and modifies the access log 150 to identify the attempt.

GUI

The modified sensitive data provided to the requesting entity is displayed on a client device 130 in a GUI or other interface provided by the interface engine 170, according to some embodiments. The GUI may include interactive elements allowing a user of the client device 130 to view fields corresponding to data from the personnel database 140, view sets of non-sensitive data, view sets of sensitive data that the user is authorized to view, request to view the sets of sensitive data, and authenticate the user. In some embodiments, the GUI may also include interactive elements that allow the user to edit information and update the personnel database 140 with the edited information.

FIGS. 4A-4E are example graphical user interfaces (GUIs) for accessing data in a database system with a client device, in accordance with an embodiment. FIGS. 4A-4E illustrate an example GUI 400 displayed on a client device 130 for a user to view non-sensitive data and sensitive information associated with an individual whose information is stored in the personnel database 140. In this example, the personnel ID 410 of the individual is "1".

Figure 4A:
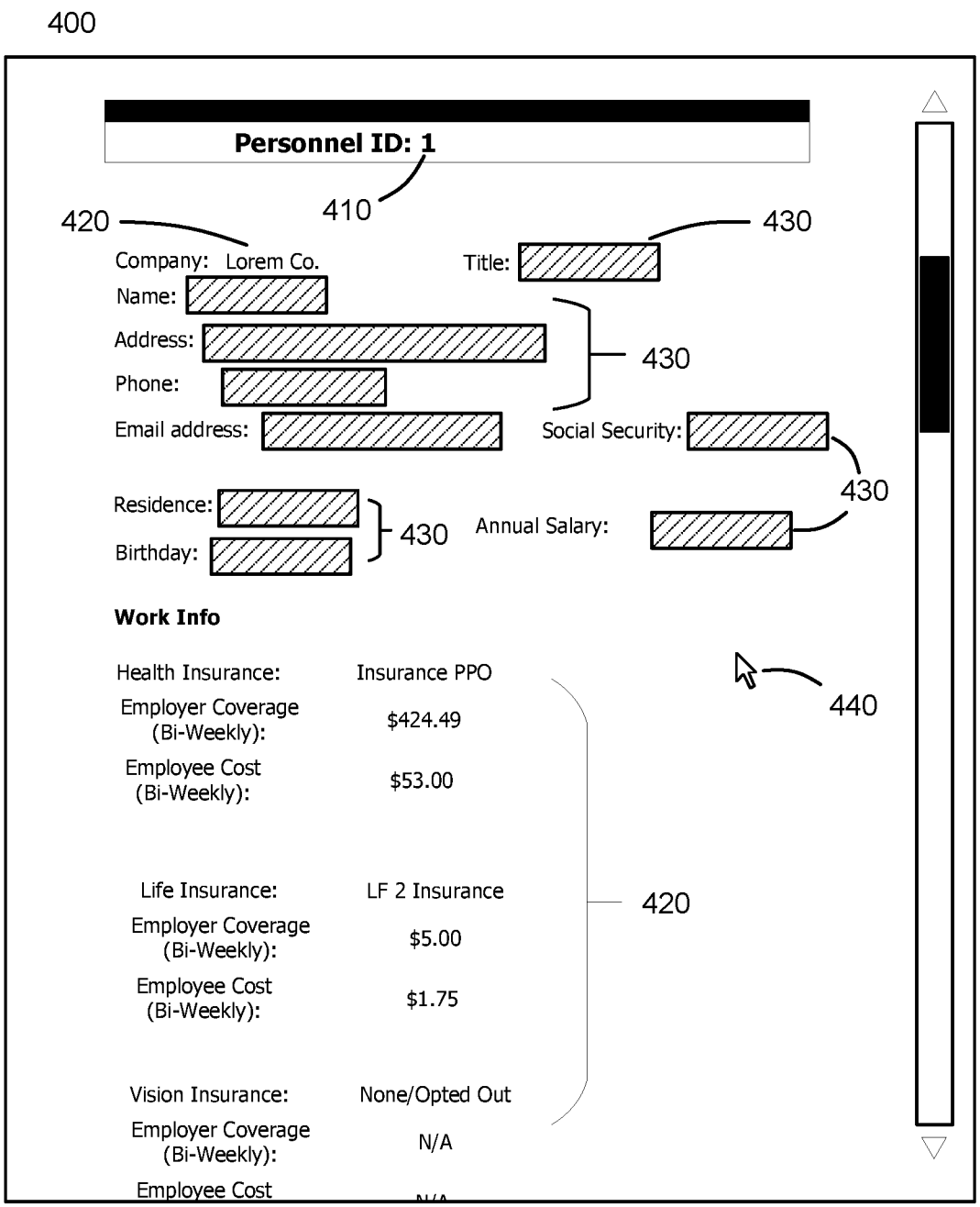

FIG. 4A shows an initial state of the GUI 400, before the user has requested to view sensitive information for the individual. The GUI 400 may include fields 420 associated with non-sensitive information. In some embodiments, the GUI instructs the client device 130 to send requests to the security engine 160 to access non-sensitive data associated with the fields 420 from the personnel database 140 automatically without further input from the user (for instance, the company name "Lorem Co."). The security engine 160 provides the non-sensitive data to the client device 130, and the non-sensitive data is displayed in corresponding fields 420 on the GUI 400. In this embodiment, the client device 130 is authorized to access non-sensitive data in the personnel database 140. In some embodiments, the client device 130 does not send requests to the security engine 160 to access sensitive data from the personnel database 140 associated with corresponding fields in the GUI 400 without further input from the user.

The GUI 400 also includes fields associated with sensitive data and corresponding selectable graphical interface elements, i.e. obscuring elements, 430, according to some embodiments. Each of the obscuring elements 430 at least partially obscure a corresponding field. For example, the obscuring element 430 may include an opaque or semi-opaque box obscuring the data field corresponding to a set of data. In alternate embodiments, each of the obscuring elements 430 is transparent and do not visually obscure the corresponding field. In this case, a blank field may be viewed by the user, each blank field corresponding to sensitive data.

The GUI 400 includes a mouse icon 440 for selecting elements in the GUI 400. The user may provide inputs on the client device 130 to select elements with the mouse icon 440. It should be noted that in other embodiments, a user can interact with the GUI 400 using other mechanisms, such as a touch-input display, a keyboard, and the like.

FIG. 4B shows a state of the GUI 400, in which the user has requested to view sensitive information. In the example of FIG. 4B, the user has selected one of the obscuring elements 430, for example, an obscuring element 430 corresponding to the field for annual salary, as shown in in FIG. 4B. The selection of the obscuring element 430 corresponding to the field for annual salary is illustrated in FIG. 4B by a mouse click 450 performed by the user on the obscuring element 430. In other embodiments, the user may select an obscuring element 430 by alternative means. The mouse click 450 is associated with a request to access data in the personnel database 140 corresponding to the annual salary of the individual with personnel ID "1". In response to the selection of the annual salary field, the client device 130 sends a request to the security engine 160 to access the sensitive data in the personnel database 140.

In response to the security engine 160 determining that the requested data is sensitive, the security engine 160 instructs the GUI 400 to display an authentication interface 460. The authentication process performed by the authentication module 210, as discussed above with respect to FIGS. 2 and 3, may be performed through the authentication interface 460. The authentication interface 460 shown in FIG. 4B is a pop-up window overlaid in a region of the GUI 400, for example in a region corresponding to the center of the GUI 400. In other embodiments, the authentication interface 460 is displayed in other ways. For example, the authentication interface 460 may be displayed in a different window and/or tab of the GUI 400, not overlapping with the region of the GUI 400 shown in FIGS. 4A-4E. The authentication interface 460 may prompt the user to input user credentials, e.g. a user ID and a password. In some embodiments, the authentication interface 460 may prompt the user to authenticate themselves via an alternate authentication method.

After the authentication on the user has been performed through the authentication interface 460, the security engine 160 modifies the access log 150 to identify the request to access the sensitive data associated with the mouse click 450, as discussed above with respect to FIGS. 2 and 3. In some embodiments, the security engine 160 further modifies the access log to identify which obscuring elements 450 were selected by the user in the request to access sensitive data in the personnel database 140. In response to the security engine 160 determining that the user is authorized to view the requested sensitive data, the security engine 160 retrieves the requested sensitive data and modifies, via the sensitive information tagging module 220, the retrieved data by modifying the metadata of the retrieved data to include the tag indicating the retrieved data is sensitive. The security engine 160 then provides the modified sensitive data to the client device 130, and the client device 130 stores the modified sensitive data locally. Each time a user attempts to view the locally stored modified sensitive data in the GUI 400, and/or otherwise access the locally stored modified sensitive data, the client device 130 instructs the security engine 160 to modify the access log 150 to identify the attempt to access the locally stored modified sensitive data. In some embodiments, the GUI 400 prompts the user to perform the authentication process via the authentication interface 460 each time the user attempts to view a different type of sensitive data in the GUI 400. In other embodiments, the GUI 400 prompts the user to perform the authentication process via the authentication interface 460 once for a session of a predetermined duration.

FIG. 4C shows a state of the GUI 400 displayed to the user in response to the security engine 160 determining that the user is authorized to view the data corresponding to the annual salary information 470 of the individual. The requested annual salary information 470 of the individual associated with the personnel ID "1" is displayed in the corresponding field. The corresponding obscuring element 430 is then removed, and the user is able to view the annual salary information 470 in the GUI 400.

Figure 4D:

FIG. 4D shows a state of the GUI 400 displayed to the user in response to the security engine 160 determining that the user is not authorized to access the requested sensitive data. In the example illustrated in FIG. 4D, the user has requested to view the e-mail address of the individual associated with the personnel ID "1" by selecting a corresponding obscuring element 430 via a mouse click 450. In this instance, the sensitive data corresponding to the e-mail address is not retrieved by the security engine 160. In response, the GUI 400 displays a denial message 480 that informs the user that their request to access the sensitive data has been denied. In some embodiments, the denial message 480 also informs the user that the request to access the sensitive data has been logged in the access log 150. In other embodiments, the denial message 480 may include additional information relevant to the database system 110. In some embodiments, the security engine may notify an administrator of the database system 110 of the request to access the sensitive data. In some embodiments, the security engine 160 initiates an audit of the access log 150 in response to determining a requesting entity is not authorized to view a requested set of sensitive data.

Figure 4E:
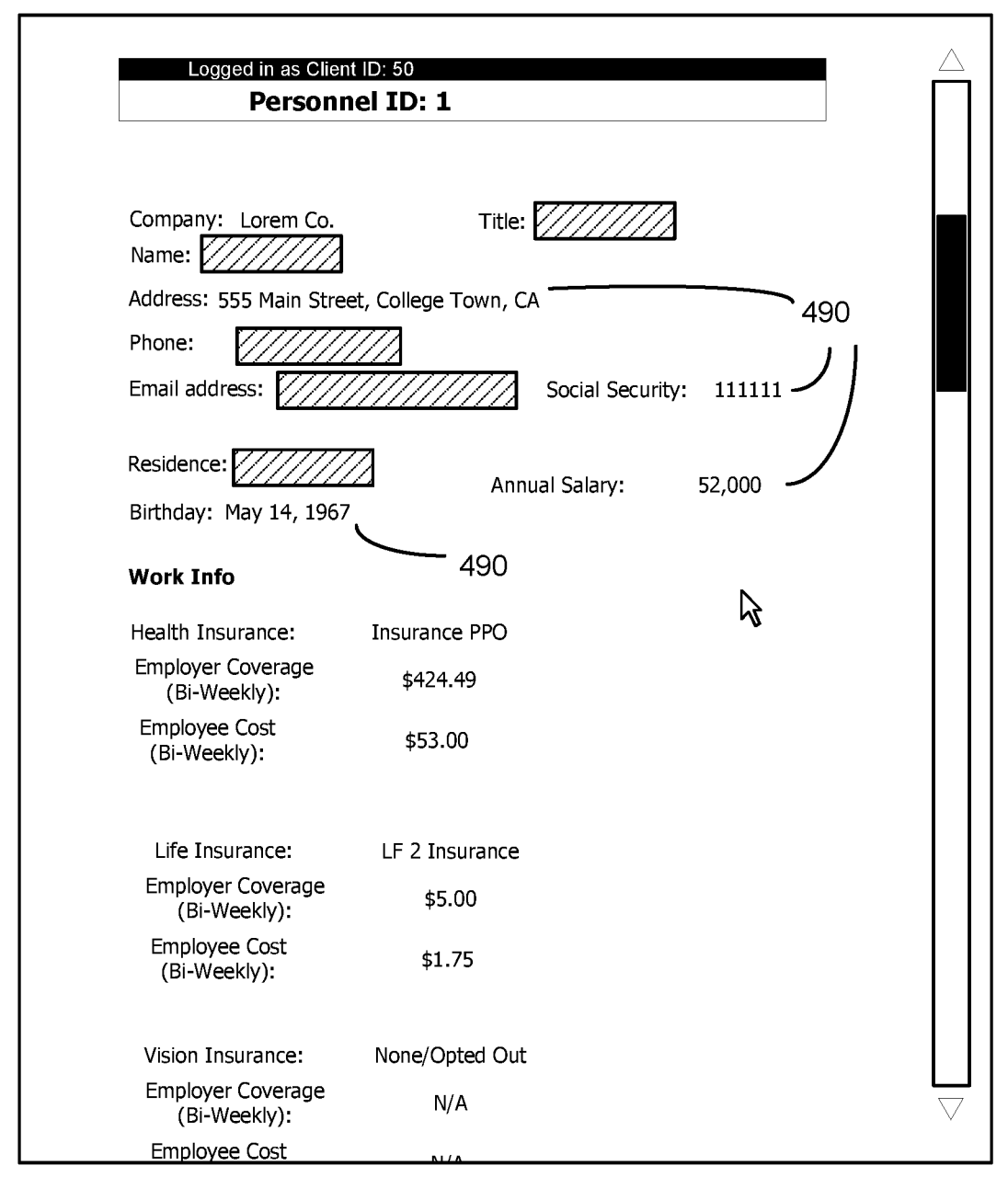

FIG. 4E shows an alternate mode of the GUI 400 that allows a user of the client device 130 to view a plurality of sensitive information 490 that the user is authorized to access, without requiring the user to select individual obscuring elements 430, according to one embodiment. In this embodiment, the user has successfully performed the authentication process through an authentication interface, e.g. authentication interface 460, at a prior state of the GUI 400. The security engine 160 determines the user is authorized to view a plurality of the requested sensitive data 490. The security engine 160 retrieves the plurality of sensitive data from the personnel database 140, modifies the plurality of sensitive data to include a sensitive tag within the metadata of the sensitive data, modifies the access log 150, and provides the plurality of modified sensitive data to the client device 130 as described above. The client device 130 stores the plurality of modified sensitive data locally, and the GUI 400 displays the plurality of sensitive information 490 corresponding to the modified sensitive data. The plurality of sensitive information 490 is displayed in corresponding fields in the GUI 400, and corresponding obscuring elements 430 are removed, such that the user is able to view the plurality of sensitive information 490 in the GUI 400 without having to individually select each corresponding obscuring element 430. The obscuring elements 430 that correspond to sensitive information that the requesting user is not authorized to access are not removed, preventing the user from viewing the corresponding sensitive information.

Auditing the Access Log

An auditing process is performed by an auditing module 230 of the security engine 160, in response to receiving a request to audit the data in the access log 150 from an auditing entity, e.g. an administrator of the database system 110.

In some embodiments, the auditing entity requests to audit the access log 150 to retrieve information associated with a potential data breach of an embodiment of the personnel database 140. For example, an administrator of the database system 110 may request to audit the access log 150 after determining that unauthorized access of sensitive information in the personnel database 140 has occurred. In response to the auditing module 230 receiving the request to audit the access log 150, an embodiment of the security engine 160 authenticates the auditing entity to determine that the auditing entity is authorized to audit the access log 150. Authentication of the auditing entity may be carried in a similar manner as the authentication process for authenticating the requesting entity, as described above with respect to the FIGS. 3 and 4B. For example, the auditing entity may input user credentials to a client device 130 during authentication.

Once the auditing entity is determined to be authorized to audit the access log 150, the auditing module 230 retrieves data from the access log 150 relevant to the request to audit. The request to audit, for example, may include a search query (for instance, identifying all access data associated with a particular requesting entity over a particular time frame). In this case, the auditing module 230 retrieves any data in the access log 150 that matches the criteria of the search query. The auditing module 230 then provides the retrieved data to the auditing entity. The retrieved data may be organized in the form of a data table with uniquely identified rows and columns, according to some embodiments. The retrieved data includes data identifying an attempt to access modified sensitive data including the tag identifying the data is sensitive.

In some embodiments, the auditing module 230 also modifies the access log 150 to identify the request to audit the access log 150 by the auditing entity. The auditing module may modify the access log 150 to further identify a date of the audit, a time of the audit, a user ID of the auditing entity, and a search query associated with the audit. The auditing module 230 may modify the access log 150 each time an auditing entity attempts to audit the access log 150.

Figure 5:
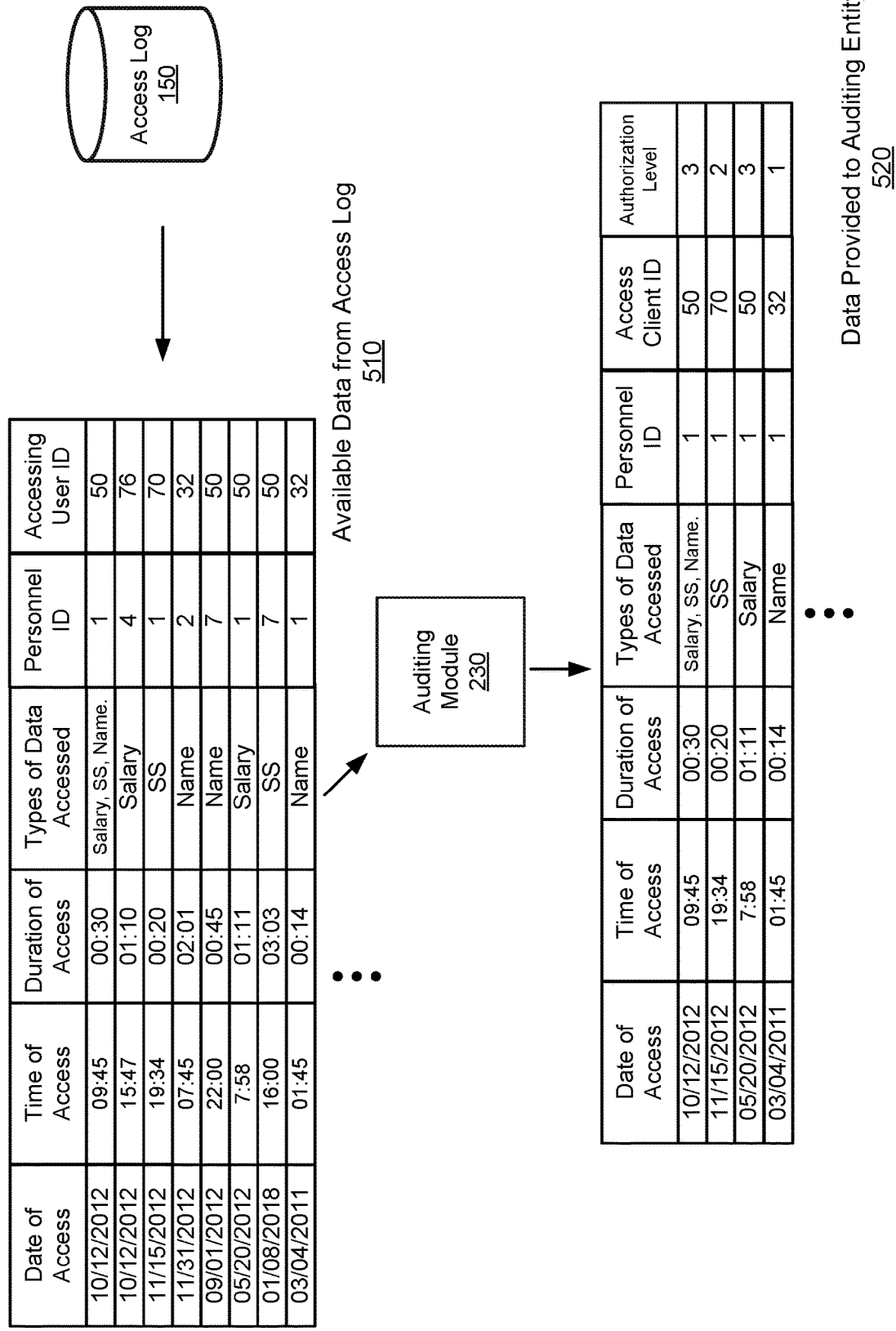
FIG. 5 illustrates an example of auditing an access log with a security engine, in accordance with an embodiment.

FIG. 5 illustrates an example of auditing an access log with a security engine, in accordance with an embodiment. An auditing process 500 is performed by an auditing module 230 in response to an administrator of the database system 110 requesting to audit an access log 150. In the embodiment of FIG. 5, the requested audit is for data identifying all previous attempts to access sensitive data in the personnel database 140 associated with an individual with personnel ID "1". For example, this request may be initiated by the administrator, in response to the administrator determining that some of the sensitive data associated with the individual that is stored in the personnel database 140 has been accessed illegally.

In response the security engine 160 determining that the administrator is authorized to audit the access log 150 via an authentication process, the auditing module 230 retrieves all data entries in the access log 150 identifying past attempts to access sensitive data associated with the individual with the personnel ID "1". A set of available data 510 in the access log 150 is shown in FIG. 3. In this case, the data in the access log 150 is organized in a data table with uniquely identified rows and columns. Each column corresponds to a data type, and each row corresponds to an attempt to access modified sensitive data with metadata modified by the security engine 160 to include a tag indicating the data is sensitive. For example, the data table may include columns corresponding to data types including: a date of access, a time of access, a duration of access, types of data accessed, a personnel ID, and an accessing user ID.

The auditing module 230 then provides the retrieved data 520 to the administrator. The administrator locally stores the retrieved data 520 on a client device 130. The administrator may view, manipulate, and/or edit the locally stored data on the client device 130, according to some embodiments. The retrieved data 520 may be organized in the form of a data table with uniquely identified columns and rows, similar to the data in the access log 150. Each column corresponds to a data type, and each row corresponds to an attempt to access modified sensitive data associated with the individual with the personnel ID "1" with metadata modified by the security engine 160 to include a tag indicating the data is sensitive.

By reviewing the retrieved data 520, the administrator may be able to determine information associated with a data breach of the personnel database 140, such as a date and time of the data breach, which data types were accessed during the data breach, and a user ID of an entity that caused the data breach.

Processes for Tagging, Accessing, and Displaying Sensitive Data

Figure 6:
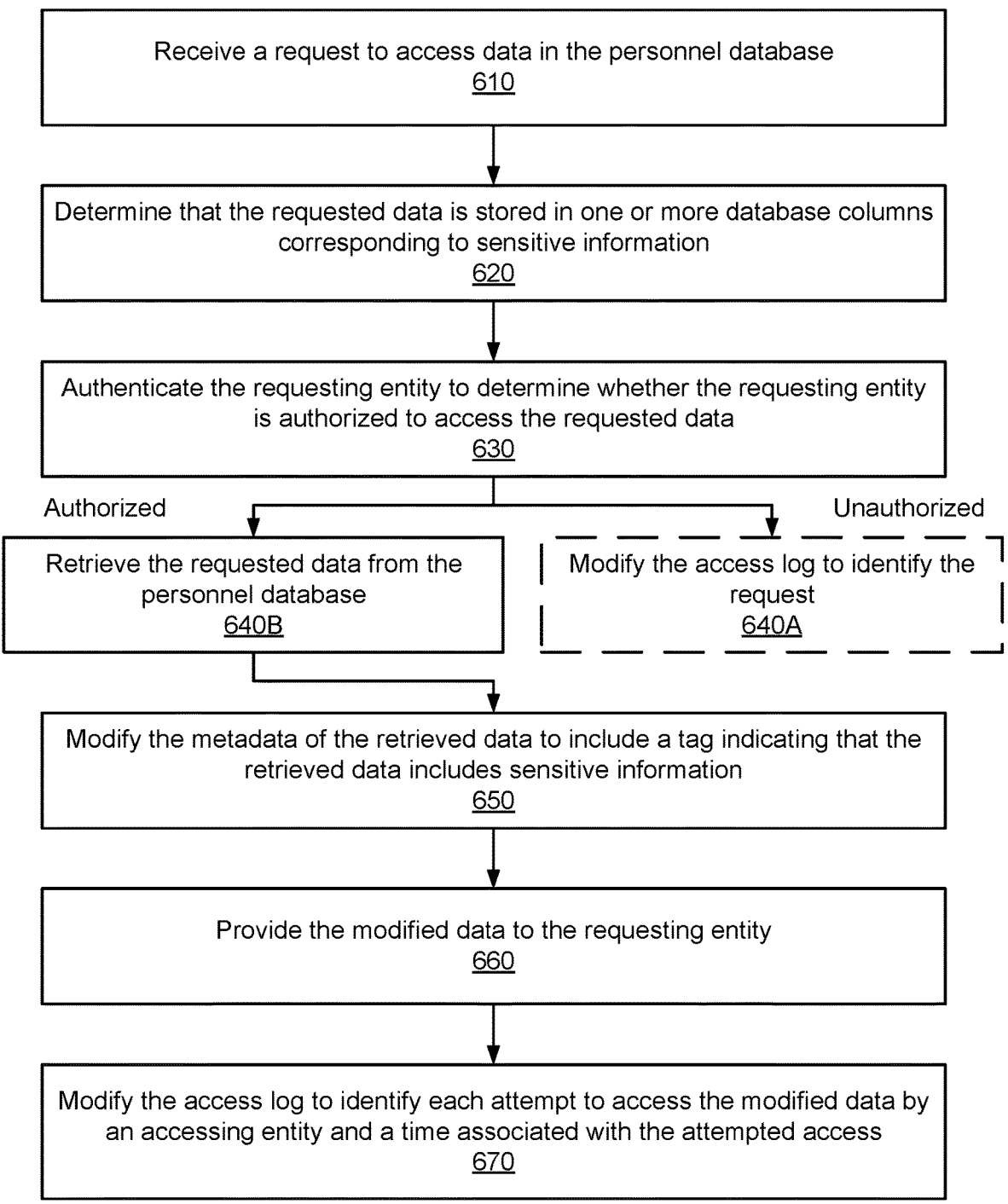
FIG. 6 is a flowchart illustrating a process for accessing and tagging sensitive information in a database using a security engine, in accordance with an embodiment.

FIG. 6 is a flowchart illustrating a process for accessing and tagging sensitive information in a database using a security engine, in accordance with an embodiment. The process 600 may be performed by an embodiment of the database system 110.

The process 600 includes receiving 610 by the security engine 170 a request from a requesting entity to access data in the personnel database 140. The security engine 170 determines 620 that the requested data is stored in one or more database columns of the personnel database 140 corresponding to sensitive information. The security engine then authenticates 630 the requesting entity to determine whether the requesting entity is authorized to access the requested data. In response to the requesting entity being unauthorized to access the data, the security engine 160 may optionally modify 640A the access log 150 to identify the request from the requesting entity to access the data in the personnel database 140 and to indicate that the requesting entity is not authorized to access the data, according to some embodiments. In response to the requesting entity being authorized to access the data, the security engine retrieves 640B the requested data from the personnel database 140.

The security engine 160 then modifies 650 the retrieved data by modifying metadata of the retrieved data to include a tag indicating that the retrieved data includes sensitive information. The security engine 160 provides 660 the modified data to the requesting entity and modifies 670 the access log 150 to identify each attempted access to the modified data by an accessing entity, the modified access log 150 identifying the accessing entity, the modified data, and a time associated with the attempted access to the modified data.

FIG. 7 is a flowchart illustrating a process for restricting a display of data in an interface, in accordance with an embodiment. The process 700 may be performed by an embodiment of the database system 110.

The process 700 of restricting a display of data includes the interface engine 170 displaying 710 an interface for displaying one or more sets of data from a database in corresponding data fields on a client device 130. For each set of non-sensitive data, the security engine 160 accesses 720 the set of data from the personnel database 150 and displays 720 the set of data within the corresponding data field;

For each set of sensitive data, the following steps are performed. The interface engine 170 displays 730 a selectable graphical interface element, e.g. obscuring element 430, within the interface to at least partially obscure the corresponding data field. In response to receiving 740 a request to view the set of sensitive data, the security engine 160 authenticates 750 the user of the client device 130 to determine whether the user is authorized to view the set of data. In some embodiments, in response to determining the user is not authorized to view the set of data, the set of data is not accessed from the personnel database 140. In some embodiments, in response to determining that the requesting entity is not authorized to view the set of data, the interface engine 170 optionally displays 760A a message in the interface indicating that the requesting entity is not authorized to view the set of data.

In response to determining that the requesting entity is authorized to view the set of data, the security engine 160 accesses 760B the set of data from the database. The security engine 160 displays 760B the set of data within the corresponding data field. In this embodiment, the request includes a selection of the graphical interface element. The Interface engine 170 then removes 770 the displayed graphical interface element from the interface such that the set of data is visible within the corresponding data field. The security engine 160 modifies 780 the access log 150 to identify the request to view the set of data, the modified access log 150 identifying the requesting entity, the set of data, and a time associated with the request to view the set of data.

Benefits

The database system 110 provides a platform for efficiently tracking the access of sensitive data in the personnel database 140 without detrimentally impacting the database or the security of the stored data. For example, the database system 110 may incorporate a legacy database to be used as a personnel database 140, without substantially altering the legacy database. Additionally, the ability to track attempts to access sensitive data being stored locally on the client devices 130 provides the benefit of additional security and accountability for users of the database system 110. The interface for displaying sensitive information shown, for example, in FIGS. 4A-4E may prevent inadvertent, unauthorized viewing of sensitive information in the personnel database 140. The database system 110 provides benefits for applications, such as human resources management, where a large volume of sensitive information is being handled by multiple users with varying levels of authority to access sensitive information in a database.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method of restricting a display of data comprising:
displaying, by a security engine, an interface on a client device of a requesting entity for displaying sensitive information in a field of the interface, the interface including an interface element that obscures the field, wherein the client device accesses information for display within the interface from a database that includes sensitive flags indicating columns of sensitive information, wherein a first portion of the information not including sensitive flags is provided to the client device for display within the interface, and wherein a second portion of the information including sensitive flags is not provided to the client device;
after displaying the interface on the client device, receiving, by the security engine, a request from the requesting entity to view the sensitive information within the field obscured by the interface element; and
after receiving the request to view the sensitive information and in response to determining that the requesting entity is authorized to view the sensitive information:
accessing, by the security engine, the sensitive information from the database;
after the sensitive information is accessed, removing, by the security engine, the interface element, wherein the field is no longer obscured when the interface element is removed; and
displaying the sensitive information within the field of the interface displayed by the client device.

2. The method of claim 1, further comprising:
accessing, by the security engine, non-sensitive information from the database; and
displaying in the interface, by the security engine, the non-sensitive information within a corresponding non-sensitive data field of the interface.

3. The method of claim 1, further comprising modifying, by the security engine, a data access log to identify the request to view the sensitive information, the modified data access log identifying the requesting entity, the sensitive information, and a time associated with the request to view the sensitive information.

4. The method of claim 3, further comprising in response to determining that the requesting entity is not authorized to view the sensitive information, initiating by the security engine, an audit of the modified data access log.

5. The method of claim 3, wherein the modified data access log further includes information representative of at least one of:
- a user account associated with the requesting entity,
- a hardware device used by the requesting entity to access the sensitive information in the database,
- a software application used by the requesting entity to access the sensitive information in the database, and
- an indication of whether a request to view the sensitive information was granted.

6. The method of claim 3, wherein the modified data access log includes information identifying the interface.

7. The method of claim 3, wherein the modified data access log further includes information identifying sensitive data fields located within the interface.

8. The method of claim 1, further comprising:
in response to determining that the requesting entity is not authorized to view the sensitive information, displaying a message in the interface indicating that the requesting entity is not authorized to view the sensitive information.

9. The method of claim 8, wherein the sensitive information is not accessed from the database in response to determining that the requesting entity is not authorized to view the sensitive information.

10. The method of claim 1, wherein the interface element comprises an opaque or semi-opaque box obscuring the field corresponding to the sensitive information.

11. A non-transitory computer readable storage medium storing executable instructions that, when executed by one or more processors, cause the one or more processors to perform steps comprising:
displaying, by a security engine, an interface on a client device of a requesting entity for displaying sensitive information in a field of the interface, the interface including an interface element that obscures the field, wherein the client device accesses information for display within the interface from a database that includes sensitive flags indicating columns of sensitive information, wherein a first portion of the information not including sensitive flags is provided to the client device for display within the interface, and wherein a second portion of the information including sensitive flags is not provided to the client device;
after displaying the interface on the client device, receiving, by the security engine, a request from the requesting entity to view the sensitive information within the field obscured by the interface element; and
after receiving the request to view the sensitive information and in response to determining that the requesting entity is authorized to view the sensitive information:
accessing, by the security engine, the sensitive information from the database;
after the sensitive information is accessed, removing, by the security engine, the interface element, wherein the field is no longer obscured when the interface element is removed; and
displaying the sensitive information within the field of the interface displayed by the client device.

12. The non-transitory computer readable storage medium of claim 11, wherein the instructions, when executed, cause the one or more processors to perform additional steps comprising:
accessing, by the security engine, non-sensitive information from the database; and
displaying in the interface, by the security engine, the non-sensitive information within a corresponding non-sensitive data field of the interface.

13. The non-transitory computer readable storage medium of claim 11, wherein the instructions, when executed, cause the one or more processors to perform additional steps comprising modifying, by the security engine, a data access log to identify the request to view the sensitive information, the modified data access log identifying the requesting entity, the sensitive information, and a time associated with the request to view the sensitive information.

14. The non-transitory computer readable storage medium of claim 13, wherein the instructions, when executed, cause the one or more processors to perform additional steps comprising in response to determining that the requesting entity is not authorized to view the sensitive information, initiating by the security engine, an audit of the modified data access log.

15. The non-transitory computer readable storage medium of claim 13, wherein the modified data access log further includes information representative of at least one of:
- a user account associated with the requesting entity,
- a hardware device used by the requesting entity to access the sensitive information in the database,
- a software application used by the requesting entity to access the sensitive information in the database, and
- an indication of whether a request to view the sensitive information was granted.

16. The non-transitory computer readable storage medium of claim 13, wherein the modified data access log includes information identifying the interface.

17. The non-transitory computer readable storage medium of claim 13, wherein the modified data access log further includes information identifying sensitive data fields located within the interface.

18. The non-transitory computer readable storage medium of claim 11, wherein the instructions, when executed, cause the one or more processors to perform additional steps comprising:
in response to determining that the requesting entity is not authorized to view the sensitive information, displaying a message in the interface indicating that the requesting entity is not authorized to view the sensitive information.

19. The non-transitory computer readable storage medium of claim 18, wherein the sensitive information is not accessed from the database in response to determining that the requesting entity is not authorized to view the sensitive information.

20. The non-transitory computer readable storage medium of claim 11, wherein the interface element comprises an opaque or semi-opaque box obscuring the field corresponding to the sensitive information.

* * * * *